United States Patent
Uchibori

(10) Patent No.: US 8,108,736 B2
(45) Date of Patent: Jan. 31, 2012

(54) MULTI-PARTITION COMPUTER SYSTEM, FAILURE HANDLING METHOD AND PROGRAM THEREFOR

(75) Inventor: Shusaku Uchibori, Yamanashi (JP)

(73) Assignee: NEC Computertechno Ltd., Yamanashi (JP)

( * ) Notice: Subject to any disclaimer, the term of this patent is extended or adjusted under 35 U.S.C. 154(b) by 134 days.

(21) Appl. No.: 12/624,186

(22) Filed: Nov. 23, 2009

(65) Prior Publication Data

US 2010/0146344 A1 Jun. 10, 2010

(30) Foreign Application Priority Data

Dec. 5, 2008 (JP) ................................. 2008-310922

(51) Int. Cl.
*G06F 11/00* (2006.01)
(52) U.S. Cl. .............................. 714/49; 714/48; 714/53
(58) Field of Classification Search .................... None
See application file for complete search history.

(56) References Cited

U.S. PATENT DOCUMENTS

| | | | |
|---|---|---|---|
| 6,823,471 B1* | 11/2004 | Arimilli et al. | 714/10 |
| 2003/0056155 A1* | 3/2003 | Austen et al. | 714/45 |
| 2003/0131067 A1* | 7/2003 | Downer et al. | 709/213 |
| 2004/0230976 A1* | 11/2004 | Slegel et al. | 718/100 |
| 2005/0091476 A1* | 4/2005 | Doing et al. | 712/227 |
| 2006/0020769 A1* | 1/2006 | Herrell et al. | 712/13 |
| 2008/0162734 A1* | 7/2008 | Uehara et al. | 710/3 |
| 2008/0301487 A1* | 12/2008 | Hatta et al. | 714/3 |

FOREIGN PATENT DOCUMENTS

| | | |
|---|---|---|
| JP | 2000235558 A | 8/2000 |
| JP | 2005122229 A | 5/2005 |
| JP | 2006260325 A | 9/2006 |

* cited by examiner

*Primary Examiner* — Gabriel Chu

(57) ABSTRACT

The present invention determines an incorrect packet from a faulty partition quickly and reliably and prevents the packet from flowing into normal partitions through simple control actions. The multi-partition computer system is a multi-partitioned computer system in which a plurality of nodes are logically divided into a plurality of partition, and each node contained in the partitions includes a packet identification unit which, upon receiving a packet, compares the partition identification information uniquely assigned to own partition against the partition identification information contained in the receive packet, and if these pieces of information do not match each other, judges and discards the receive packet as an incorrect packet.

15 Claims, 4 Drawing Sheets

MULTI-PARTITION COMPUTER SYSTEM, FAILURE HANDLING METHOD AND PROGRAM THEREFOR

INCORPORATION BY REFERENCE

This application is based upon and claims the benefit of priority from Japanese patent application No. 2008-310922, filed on Dec. 5, 2008, the disclosure of which is incorporated herein in its entirety by reference.

TECHNICAL FIELD

The present invention relates to a multi-partition computer system, and more particularly, to a multi-partition computer system, a failure handling method and a program therefor, which can determine a faulty partition quickly and reliably and thereby prevent the impact of the failure from propagating to normal partitions.

BACKGROUND ART

Against a background of the recent trends in computer systems toward multi-processor and multi-core technologies, it has become common to use a multi-partition computer system, in which the single system is divided into a plurality of subsystems that are independent of each other. An important challenge for a multi-partition computer system is to prevent a failure that has occurred in one of its partitions from propagating to the other normal partitions.

Examples of related arts that prevent a failure in one of the partitions of a multi-partition computer system from propagating to the other normal partitions include the three methods described below.

The first example is the method disclosed in Patent Literature 1 (Japanese Patent Laying-Open No. 2006-260325). In this method, a faulty partition for which an error has been detected notifies the error to the resources that belong to own partition, e.g. a processor, memory and I/O, to cause them to stop operating, thereby preventing an incorrect packet from flowing out from the faulty partition. As means of notifying an error, the method proposes various measures, such as the one that uses a leased circuit, the one that uses a packet dedicated to the error notification function and the one that notifies via a service processor.

The second example is the method disclosed in Patent Literature 2 (Japanese Patent Laying-Open No. 2005-122229). This method provides a management table for managing the resources contained in the partitions within a common part for shared use by the partitions, for example, a crossbar. Using this table, the method monitors packets, indexes the management table based on the destination or source address, etc. of each packet and thereby prevents an incorrect packet from flowing out from the faulty partition to the normal partitions.

The third example is the method disclosed in Patent Literature 3 (Japanese Patent Laying-Open No. 2000-235558). This method provides a management table for managing the resources contained in the partitions on the respective resource sides contained in the partitions. Using a firewall, it monitors packets, indexes the management table based on the destination or source address, etc. of each packet and thereby prevents an incorrect packet from flowing out from the faulty partition to normal partitions.

Patent Literature 1: Japanese Patent Laying-Open No. 2006-260325
Patent Literature 2: Japanese Patent Laying-Open No. 2005-122229
Patent Literature 3: Japanese Patent Laying-Open No. 2000-235558

The first method disclosed in Patent Literature 1 is problematic in that a long time is required from when a failure occurred and an error is detected until when the error is notified and operations are stopped. During this period, incorrect packets may propagate to normal partitions, causing these partitions to be adversely affected. There is also the problem of high cost involved when building a system based on the method, because this method requires a complex mechanism in order to realize the error notification and operation stoppage functions.

A problem common between the second and third methods disclosed in Patent Literatures 2 and 3, respectively, is attributable to the use of a management table to manage the resources contained in partitions (e.g. processor, memory and I/O). As the system grows in size, the management table becomes larger, making it more costly to realize the respective methods. Another problem is that, as the system grows in size, setting complexity for the management table increases, leading to a higher likeliness of errors in the settings of the management table. If an error occurs in the settings of the management table, incorrect packets may propagate to normal partitions, resulting in adverse impact on these partitions. Furthermore, in cases where partition borders are changed dynamically, a problem is encountered that making changes in the management table can be extremely cumbersome.

EXEMPLARY OBJECT OF INVENTION

An exemplary object of the present invention is to provide a multi-partition computer system, a failure handling method and a program therefor, which can determine an incorrect packet from a faulty partition quickly and reliably through simple control actions, thereby preventing the incorrect packet from flowing into normal partitions.

SUMMARY

According to a first exemplary aspect of the invention, a multi-partitioned computer system in which a plurality of nodes are logically divided into a plurality of partitions, wherein a node contained in one of the partitions includes a packet identification unit which, upon receiving a packet, compares the partition identification information uniquely assigned to own partition against the partition identification information contained in the receive packet, and if these pieces of information do not match each other, judges and discards the receive packet as an incorrect packet.

According to a second exemplary aspect of the invention, a node in a multi-partitioned computer system in which a plurality of nodes are logically divided into a plurality of partitions, includes a packet identification unit which, upon receiving a packet, compares the partition identification information uniquely assigned to own partition against the partition identification information contained in the receive packet, and if these pieces of information do not match each other, judges and discards the receive packet as an incorrect packet.

According to a third exemplary aspect of the invention, a failure handling method for a multi-partitioned computer system in which a plurality of nodes are logically divided into a plurality of partitions, a node contained in one of the partitions performing steps of:

upon receiving a packet, comparing the partition identification information uniquely assigned to own partition against the partition identification information contained in the receive packet; and if these pieces of information do not match each other, judging and discarding the receive packet as an incorrect packet.

According to a fourth exemplary aspect of the invention, a computer readable medium storing a failure handling program executed on the node in a multi-partitioned computer system in which a plurality of nodes are logically divided into a plurality of partitions, wherein the failure handling program causes a node contained in one of the partitions, upon receiving a packet, to execute a processing of comparing the partition identification information uniquely assigned to own partition against the partition identification information contained in the receive packet, and if these pieces of information do not match each other, judging and discarding the receive packet as an incorrect packet.

According to the present invention, an incorrect packet from a faulty partition can be determined quickly and reliably and be prevented from flowing into normal partitions through simple control actions.

EXEMPLARY EMBODIMENT

Exemplary embodiments of the present invention will now be described in detail with reference to the drawings.

Structure of First Exemplary Embodiment

Figure 2:
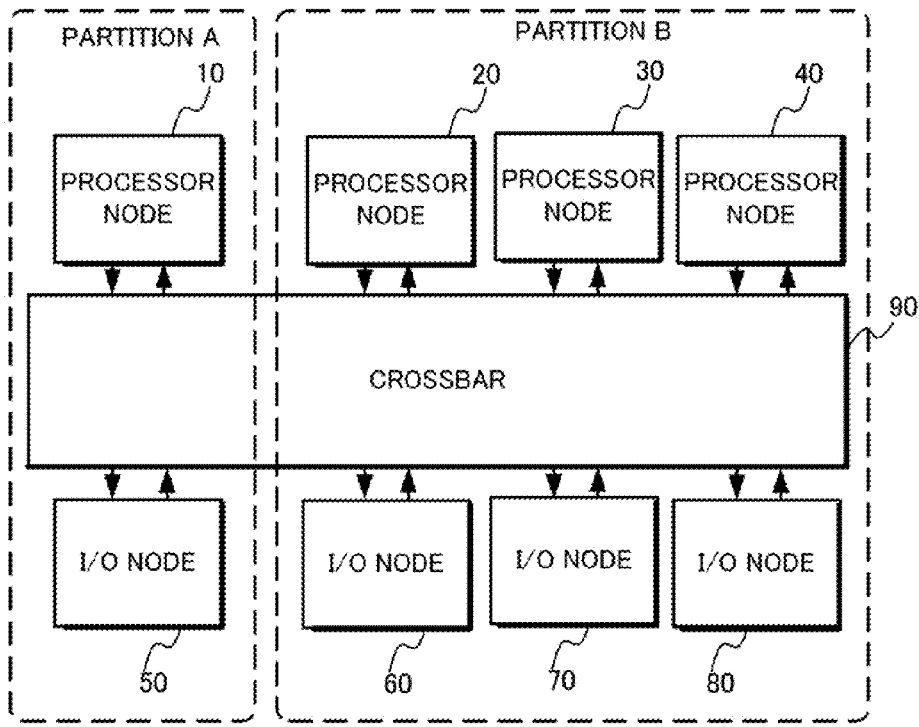
FIG. 2 is a block diagram which shows an example general structure of the multi-partition computer system according to the first exemplary embodiment of the invention.

FIG. 2 is a block diagram which shows an example structure of the multi-partition computer system according to a first exemplary embodiment of the invention.

As shown in FIG. 2, the multi-partition computer system is structured by comprising a plurality of processor nodes 10-43, a plurality of I/O nodes 50-80 and a crossbar 90 which connects between these nodes.

The multi-partition computer system is logically divided into a plurality of partitions: A and B. The partition A comprises the processor node 10 and the I/O node 50; the partition B comprises the processor nodes 20-40 and the I/O nodes 60-80.

Although this exemplary embodiment is explained by taking as an example a structure with four processor nodes, four I/O nodes, one crossbar and two partitions, the structure of the multi-partition computer system is not limited to these numbers of processor nodes, I/O nodes, crossbars and partitions, but can be realized by using any other numbers of these elements.

Figure 1:
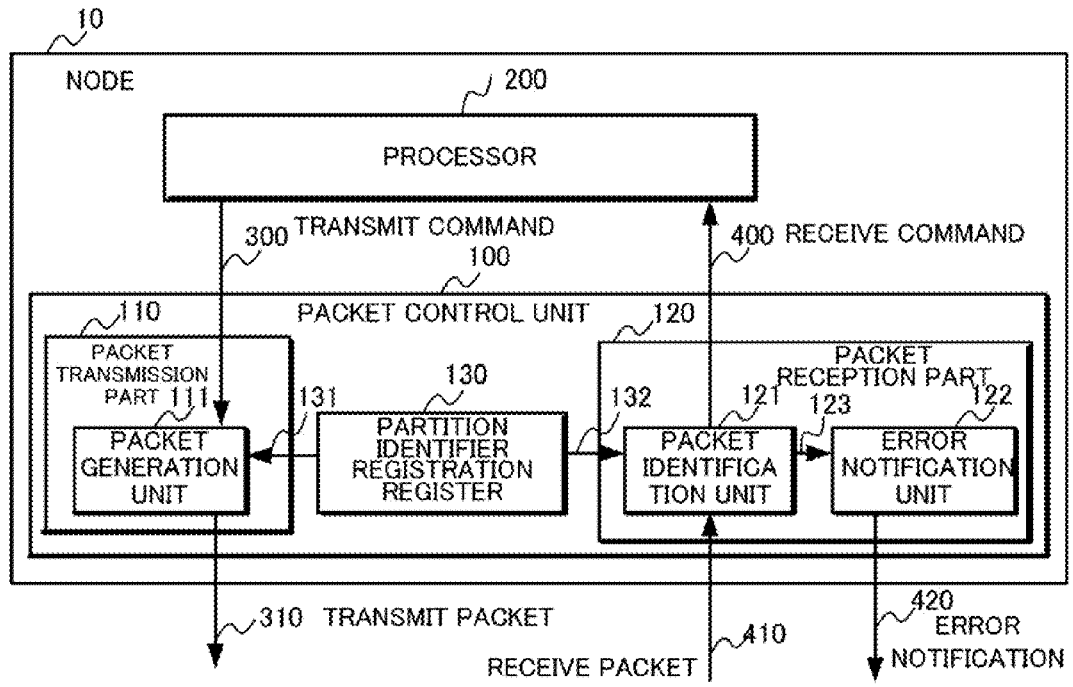
FIG. 1 is a block diagram which shows an example structure of a node in a multi-partition computer system according to the first exemplary embodiment of the invention.

FIG. 1 is a block diagram which shows an example detailed structure of the processor node 10 (-40) shown in FIG. 2. The structure of the processor node 10 will be described below, since it is the same among all the processor nodes 10-40.

The processor node 10 comprises at least one processor 200 and one packet control unit 100. The packet control unit 100 further comprises a packet transmission part 110, a packet reception part 120 and a partition identifier registration register 130.

As shown in FIG. 1, the packet transmission part 100 yet further comprises a packet generation unit 111. The packet generation unit 111 generates a packet from a transmit command 300 received from the processor 200 and a partition identifier 131 registered in the partition identifier registration register 130, and transmits the resultant packet to the crossbar 90 as a transmit packet 310.

Figure 3:
FIG. 3 is a diagram which shows an example structure of a packet generated by the packet generation unit of a related art.
Figure 4:
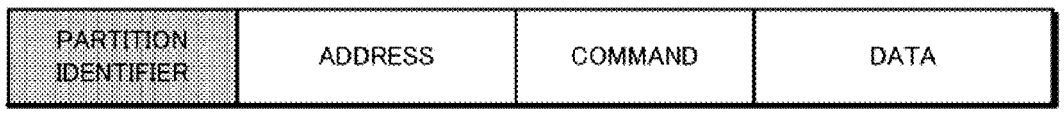
FIG. 4 is a diagram which shows an example structure of a packet generated by the packet generation unit of the multi-partition computer system according to the first exemplary embodiment of the invention.

The structure of a packet generated by the packet generation unit of the related art described in the BACKGROUND ART section consists of, for example, an address, a command and data, as shown in FIG. 3. On the other hand, a packet generated by the packet generation unit 111 according to this exemplary embodiment is structured with, for example, an address, a command, data and additionally a partition identifier, as shown in FIG. 4.

As shown in FIG. 1, the packet reception part 120 comprises a packet identification unit 121. The packet identification unit 121 compares the partition identifier in the receive packet 410 against the partition identifier 132 registered in the partition identifier registration register 130. If these partition identifiers match each other, it sends the receive packet to the processor 200 as a receive command 400.

If these identifiers do not match each other, the packet identification unit 121 judges that this is a packet sent incorrectly from a faulty partition. It discards the receive packet 410 and notifies an error 123 to the error notification unit 122. The error notification unit 122 has a function to send a notification 420 of the occurrence of an error to the partition which is the source of the incorrect packet.

In FIG. 1, the partition identifier registration register 130 is a storage means to store a partition identifier uniquely assigned to own partition (i.e. a partition to which own processor node belongs). While a partition number is generally used as the partition identifier, the identifier does not necessarily have to be a partition number but may be any number as long as it can uniquely identify own partition.

The description above of the detailed structure of this exemplary embodiment does not include the detailed structures of the components of the packet transmission part 110 and the packet reception part 120 other than those described above, because they are well known among those skilled in the art.

In this exemplary embodiment, the structure of the I/O nodes 50-80 is similar to that of the processor nodes 10-40 explained in the description above.

Also in this exemplary embodiment, the packet control unit 100 is provided on the processor node, but it can be provided within the processor 200 or at the port part of the crossbar 90. Finally, a network switch may be used in place of a crossbar to achieve the functions of the crossbar 90.

Operation of First Exemplary Embodiment

The operation of the first exemplary embodiment structured as described above will be explained in detail below.

First, the operation of the packet transmission part 110 will be explained. The packet generation unit 101 generates a transmit packet 310, based on a transmit command 300 received from the processor 200. More specifically, the packet generation unit 101 reads out from the partition identifier registration register 130 the partition identifier 1301 uniquely assigned to own partition and adds the partition identifier 1301 to the packet format shown in FIG. 3, thereby generating a packet in the packet format as shown in FIG. 4. The packet generation unit 101 sends the resultant packet to the crossbar 90 as a transmit packet 310.

Thus, each transmit packet transmitted from the node 10 is added the partition identifier uniquely assigned to the partition to which the node 10 belongs.

Figure 5:
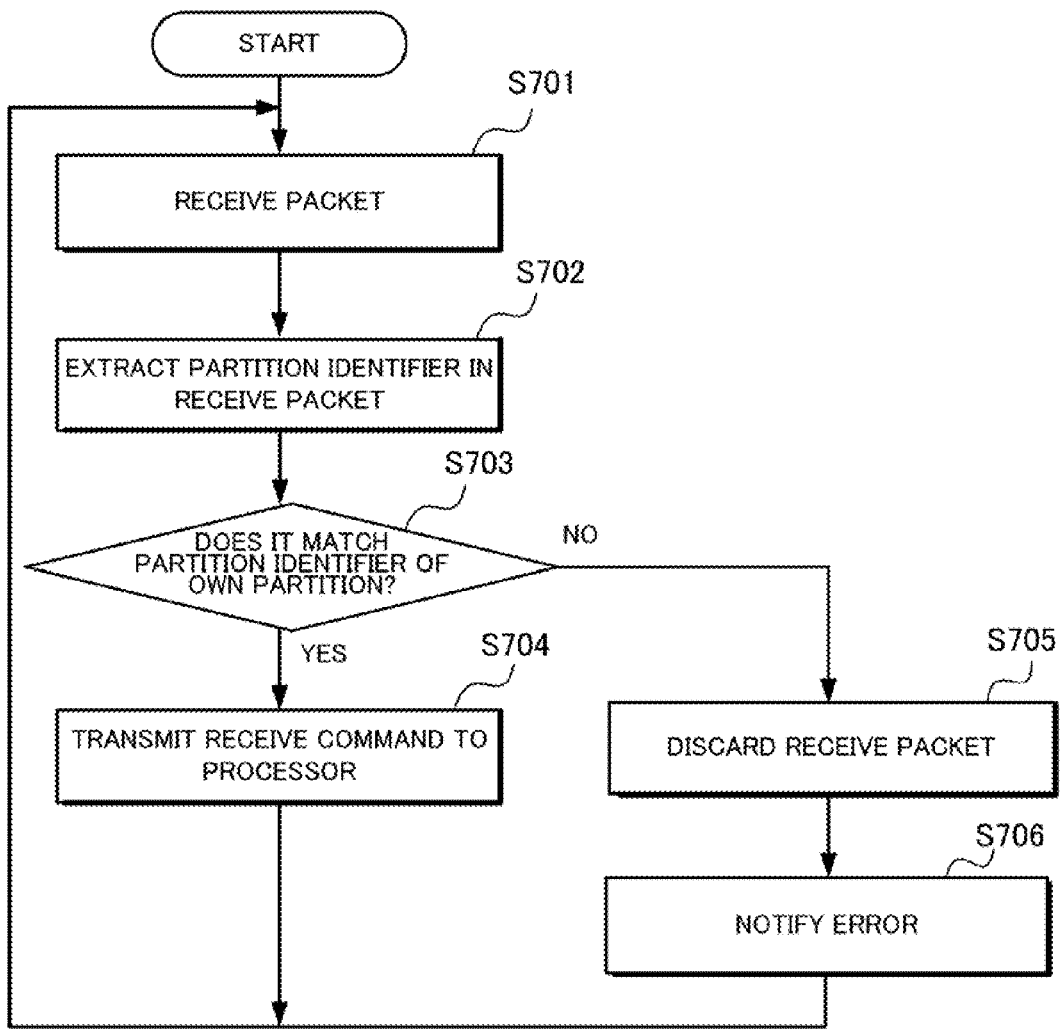
FIG. 5 is a flow chart which illustrates the operation of the packet reception part of a processor node according to the first exemplary embodiment of the invention.

Next, the operation of the packet reception part 120 will be described with reference to the flow chart of FIG. 5.

Upon receiving a receive packet 410 from the crossbar 90 (step S701), the packet identification unit 201 of the packet reception part 120 extracts from the receive packet 410 the partition identifier contained in the receive packet 410 (step S702).

The packet identification unit 201 then compares the partition identifier extracted from the receive packet 410 against own partition's unique partition identifier 302 registered in the partition identifier registration register 130 (step S703).

If these partition identifiers match each other, the packet identification unit 201 judges the receive packet 410 to be a correct packet and transmits the receive packet 410 to the processor 200 as a receive command 400 (step S704).

Otherwise, the packet identification unit 201 discards the receive packet 410, judging it to be an incorrect packet (step S705). By this, the incorrect packet is prevented from entering into own partition. In addition, the packet identification unit 201 notifies the occurrence of an error to the partition with the partition identifier contained in the receive packet 410 which has been judged to be an incorrect packet (step S706).

Effects of First Exemplary Embodiment

According to the exemplary embodiment described above, the following effects can be obtained.

Firstly, by adding each of all packets a partition identifier for identifying which partition the packet belongs to and comparing the partition identifier in the packet received against the identifier of own partition, an incorrect packet from another partition in which a failure has occurred can be determined quickly and reliably through simple control actions and thereby be prevented from flowing into own partition.

Secondly, since an incorrect packet is determined based on the partition identifier contained therein only, it is easy to respond to dynamic changes in nodes contained in partitions (i.e. processor nodes and I/O nodes).

Thirdly, the invention can be implemented and realized with low cost even in the case of a large-scale computer system, because only a low quantity of hardware is required.

Second Exemplary Embodiment

A second exemplary embodiment of the invention will now be described in detail with reference to the drawings.

The general structure of a multi-partition computer system and the structure of its node according to the second exemplary embodiment are the same as those according to the first exemplary embodiment shown in FIG. 1 and FIG. 2, and thus will be omitted from the description below.

In the second exemplary embodiment, a new scheme is added to the crossbar 90, which is a common part for shared use among partitions. The structure of the crossbar 90 according to the second exemplary embodiment of the present invention is shown in FIG. 6.

Figure 6:
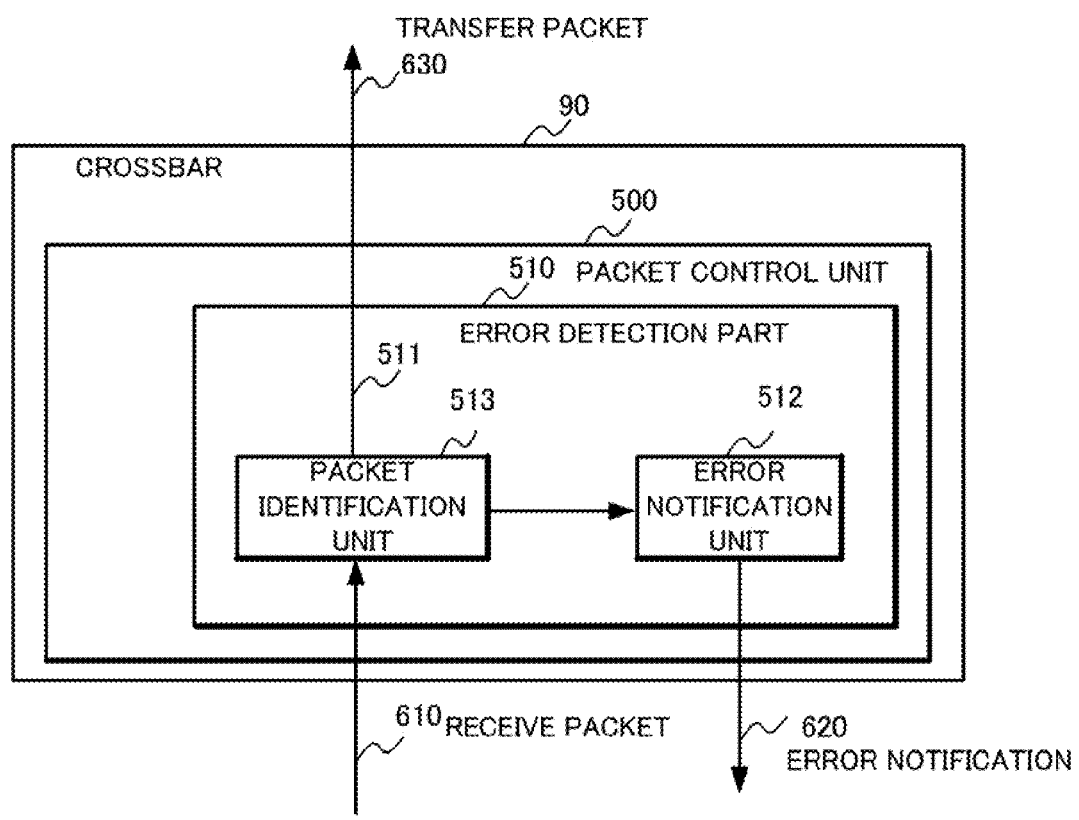
FIG. 6 is a block diagram which shows an example structure of a crossbar in a multi-partition computer system according to the second exemplary embodiment of the invention.

As shown in FIG. 6, the crossbar 90 comprises a packet control unit 500, which has an error detection part 510. The detailed structures of other components of the crossbar 90 are well known to those skilled in the art and thus will be omitted from the description below.

The error detection part 510 of the packet control unit 500 further comprises a packet identification unit 511 and an error notification unit 512. The error detection part 510 has a function to detect an error in a received packet by means of an error detection method using checksum, CRC (Cyclic Redundancy Check), etc.

If an error is detected in a receive packet 51, the packet identification unit 501 extracts the partition identifier 503 contained in the packet and notifies it to the error notification unit 502. Based on the partition identifier 503, the error notification unit 502 selects a partition having that partition identifier uniquely assigned thereto and executes the process of error notification 52.

Effects of Second Exemplary Embodiment

According to the second exemplary embodiment, an effect is obtained that situations in which multiple partitions go down can be prevented by having the crossbar, which is a common part for shared use among partitions, report an error only to the partition to which the packet belongs where the error has occurred.

Next, an example hardware structure for the processor node 10 will be described with reference to the block diagram of FIG. 7.

Figure 7:
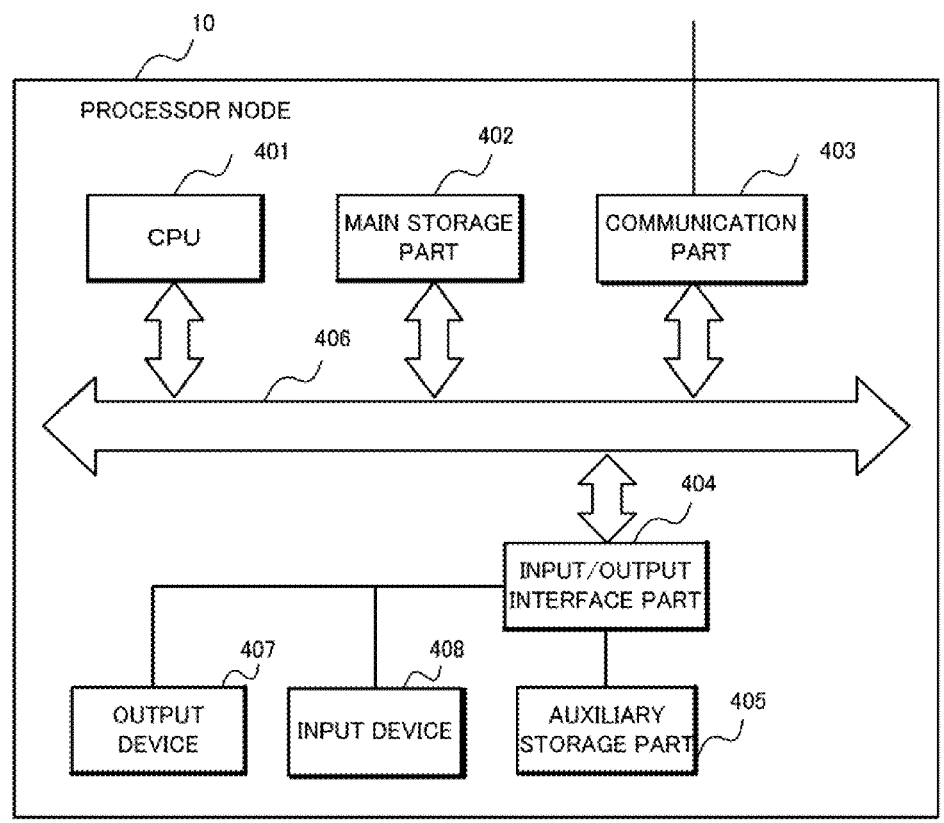
FIG. 7 is a diagram which shows an example hardware structure for a processor node in a multi-partition computer system according to an exemplary embodiment of the invention.

As shown in FIG. 7, the processor node 10 may be realized in any hardware structure similar to general computer devices, and comprises a CPU (Central Processing Unit) 401 (which corresponds to the processor 200); a main storage part 402, which consists of a RAM (Random Access Memory) and other memories and which is used as data workspace and temporary save space for data; a communication part 403, which transmits and receives data via the network 600; an input/output interface part 404, which is connected with an external device to perform transmission/receipt of data; an auxiliary storage part 405 (which corresponds to the partition identifier registration register 130), which is a hard disc device consisting of a nonvolatile memory, such as a ROM (Read Only Memory), magnetic disc and semiconductor memory; a system bus 406, which connects between the above-mentioned components of this information processing apparatus; an output device 407, such as a display device; and an input device 408, such as a keyboard.

It goes without saying that the processor node 10 according to this exemplary embodiment can be realized as hardware by implementing a circuit component, which is a hardware component, such as an LSI (Large Scale Integration), incorporating a failure handling program that executes the functions of the packet generation unit 111 of the packet transmission part 110 of the packet control unit 100 and those of the packet identification unit 121 and the error notification unit 122 of the packet reception part 120. In addition, it can also be realized as software by storing a failure handling program that provides the functions of the packet generation unit 111, the packet identification unit 121 and the error notification unit 122 in the auxiliary storage part 405, loading the program into the main storage part 402, and executing the program on the CPU 301.

It should also be noted that the I/O nodes 50-80 have the same hardware structure as that of the processor node 100 shown in FIG. 7.

While the present invention has been described by taking preferred exemplary embodiments as examples, it should be appreciated that the invention is not limited to these exemplary embodiments but can be embodied with a variety of modifications without departing from the spirit and scope of its technical principle.

What is claimed is:

1. A multi-partitioned computer system in which a plurality of nodes are logically divided into a plurality of partitions, wherein a node contained in one of said partitions includes
a packet identification unit which, upon receiving a packet, compares the partition identification information uniquely assigned to its own partition against the partition identification information contained in the receive packet, and if these pieces of information do not match each other, judges and discards said receive packet as an incorrect packet,
wherein a crossbar which connects between said nodes is provided; and
said crossbar has an error detection unit which detects an error in a packet received,
a packet identification unit which extracts said partition identification information in the receive packet for which the error has been detected, and
an error notification unit which notifies the error to the partition having said partition identification information.

2. The multi-partition computer system according to claim 1, wherein said node has a packet transmission unit which generates and transmits a packet containing partition identification information for identifying own partition.

3. The multi-partition computer system according to claim 1, wherein said node has a partition identification information registration unit which stores partition identification information uniquely assigned to its own partition; and
said packet identification unit extracts said partition identification information contained in said receive packet, and
compares said partition identification information extracted against said partition identification information registered in said partition identification information registration unit.

4. The multi-partition computer system according to claim 3, wherein said packet transmission unit generates said transmit packet by adding said partition identification information registered in said partition identification information registration unit.

5. The multi-partition computer system according to claim 1, wherein said node has an error notification unit which, if said packet identification unit has discarded said receive packet, notifies an error to another partition having said partition identification information contained in said receive packet.

6. A failure handling method for a multi-partitioned computer system in which a plurality of nodes are logically divided into a plurality of partitions, comprising:
a node contained in one of said partitions performing steps of:
upon receiving a packet, comparing the partition identification information uniquely assigned to its own partition against the partition identification information contained in the receive packet; and
if these pieces of information do not match each other, judging and discarding said receive packet as an incorrect packet,
wherein a crossbar which connects between said nodes performs the processes of:
detecting an error in a packet received;
extracting said partition identification information in the receive packet for which the error has been detected; and
notifying the error to the partition having said partition identification information extracted.

7. The failure handling method according to claim 6, wherein said node generates and transmits a packet which contains partition identification information for identifying own partition.

8. The failure handling method according to claim 6, wherein said node
extracts said partition identification information contained in said receive packet, and
compares said partition identification information extracted against said partition identification information registered in the partition identification information registration unit which stores a partition identification information uniquely assigned to its own partition.

9. The failure handling method according to claim 8, wherein said transmit packet is generated by adding said partition identification information registered in said partition identification information registration unit.

10. The failure handling method according to claim 6, wherein said node, if said node has discarded said receive packet, notifies an error to another partition having said partition identification information contained in said packet.

11. A non-transitory computer readable medium storing a failure handling program executed on said node and a crossbar which connects between said nodes in a multi-partitioned computer system in which a plurality of nodes are logically divided into a plurality of partitions, wherein said failure handling program causes a node contained in one of said partitions, upon receiving a packet, to execute a processing of comparing the partition identification information uniquely assigned to its own partition against the partition identification information contained in the receive packet, and if these pieces of information do not match each other, judging and discarding said receive packet as an incorrect packet,
wherein said failure handling program causes said crossbar to execute a processing of:
detecting an error in a packet received;
extracting said partition identification information in the receive packet for which the error has been detected; and
notifying the error to the partition having said partition identification information extracted.

12. The non-transitory computer readable medium according to claim 11, wherein said failure handling program causes said node to execute a processing of generating and transmitting a packet which contains partition identification information for identifying own partition.

13. The non-transitory computer readable medium according to claim 11, wherein said failure handling program causes said node to execute a processing of:

extracting said partition identification information contained in said receive packet; and comparing said partition identification information extracted against said partition identification information registered in said partition identification information registration unit which stores a partition identification information uniquely assigned to its own partition.

14. The non-transitory computer readable medium according to claim 13, wherein said failure handling program causes said node to execute a processing of generating said transmit packet by adding said partition identification information registered in said partition identification information registration unit.

15. The non-transitory computer readable medium according to claim 11, wherein said failure handling program causes said node to execute a processing of, if said node has discarded said receive packet, notifying an error to another partition having said partition identification information contained in said packet.

* * * * *